(12) United States Patent
Huang et al.

(10) Patent No.: US 11,713,088 B2
(45) Date of Patent: Aug. 1, 2023

(54) LEG MECHANISM AND HUMANOID ROBOT

(71) Applicant: UBTECH ROBOTICS CORP LTD, Shenzhen (CN)

(72) Inventors: Liang Huang, Shenzhen (CN); Hongyu Ding, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 369 days.

(21) Appl. No.: 17/134,202

(22) Filed: Dec. 25, 2020

(65) Prior Publication Data

US 2021/0197909 A1 Jul. 1, 2021

(30) Foreign Application Priority Data

Dec. 30, 2019 (CN) .......................... 201911402441.3

(51) Int. Cl.
*B62D 57/032* (2006.01)
*B25J 13/08* (2006.01)
*B25J 17/00* (2006.01)

(52) U.S. Cl.
CPC .......... *B62D 57/032* (2013.01); *B25J 13/085* (2013.01); *B25J 17/00* (2013.01)

(58) Field of Classification Search
CPC ........ B62D 57/032; B25J 13/085; B25J 17/00
See application file for complete search history.

(56) References Cited

U.S. PATENT DOCUMENTS

| | | | | |
|---|---|---|---|---|
| 6,658,962 | B1 * | 12/2003 | Rosheim | B25J 17/0275 901/26 |
| 8,138,707 | B2 * | 3/2012 | Takenaka | B62D 57/032 901/1 |
| 8,875,594 | B2 * | 11/2014 | Alfayad | B62D 57/032 901/18 |
| 9,446,514 | B2 * | 9/2016 | Nagatsuka | B25J 9/1065 |

FOREIGN PATENT DOCUMENTS

CN 1883994 A 12/2006

* cited by examiner

*Primary Examiner* — Jake Cook

(57) ABSTRACT

A leg mechanism of a humanoid robot includes: an upper leg, a lower leg rotatably coupled to the upper leg, a knee module actuator mounted to the upper leg, a foot rotatably connected to the lower leg, a knee transmission mechanism connected to the knee module actuator and the lower leg and configured to transmit rotary motion from the knee module actuator to the lower leg, at least one ankle module actuator mounted to the upper leg, at least one ankle transmission mechanism connected to the at least one ankle module actuator and the foot and configured to transmit rotary motion from the at least one ankle module actuator to the foot.

18 Claims, 13 Drawing Sheets

LEG MECHANISM AND HUMANOID ROBOT

CROSS REFERENCE TO RELATED APPLICATIONS

This application claims priority to Chinese Patent Application No. CN201911402441.3, filed Dec. 30, 2019, which is hereby incorporated by reference herein as if set forth in its entirety.

BACKGROUND

1. Technical Field

The present disclosure generally relates to robots, and particularly to a leg mechanism and a humanoid robot.

2. Description of Related Art

Leg driven robots (e.g., humanoid robots) can be configured to walk and/or run and even climb. Many conventional robots are designed to be highly versatile but at the expense of complexity. With numerous joints and degrees of freedom, conventional robots require complex linkages and numerous motors and encoders rendering them to have legs of large moment of inertia requiring large output torque of actuators.

Therefore, there is a need to provide a leg mechanism and a robot to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
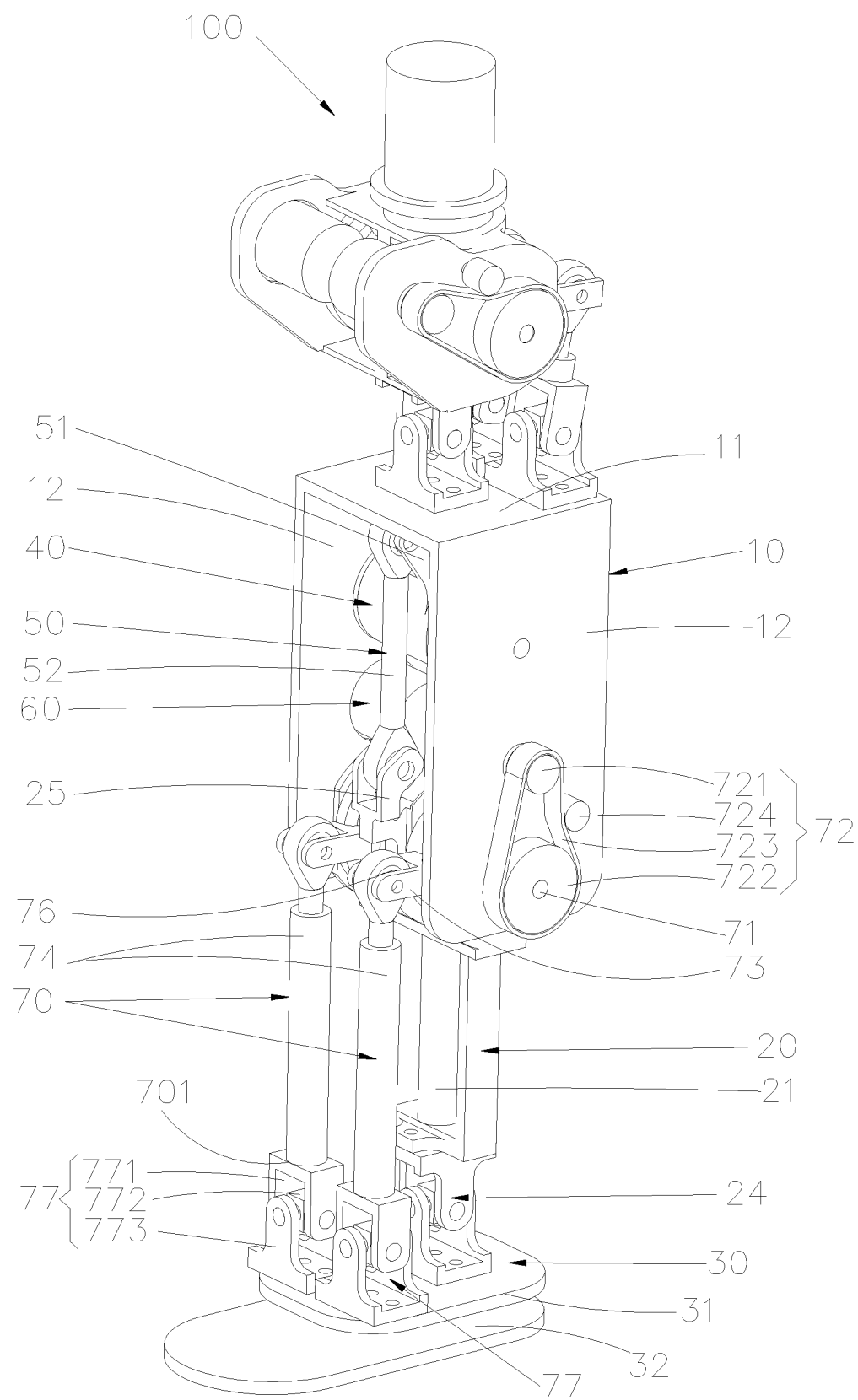
FIG. 1 is an isometric view of a leg mechanism according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
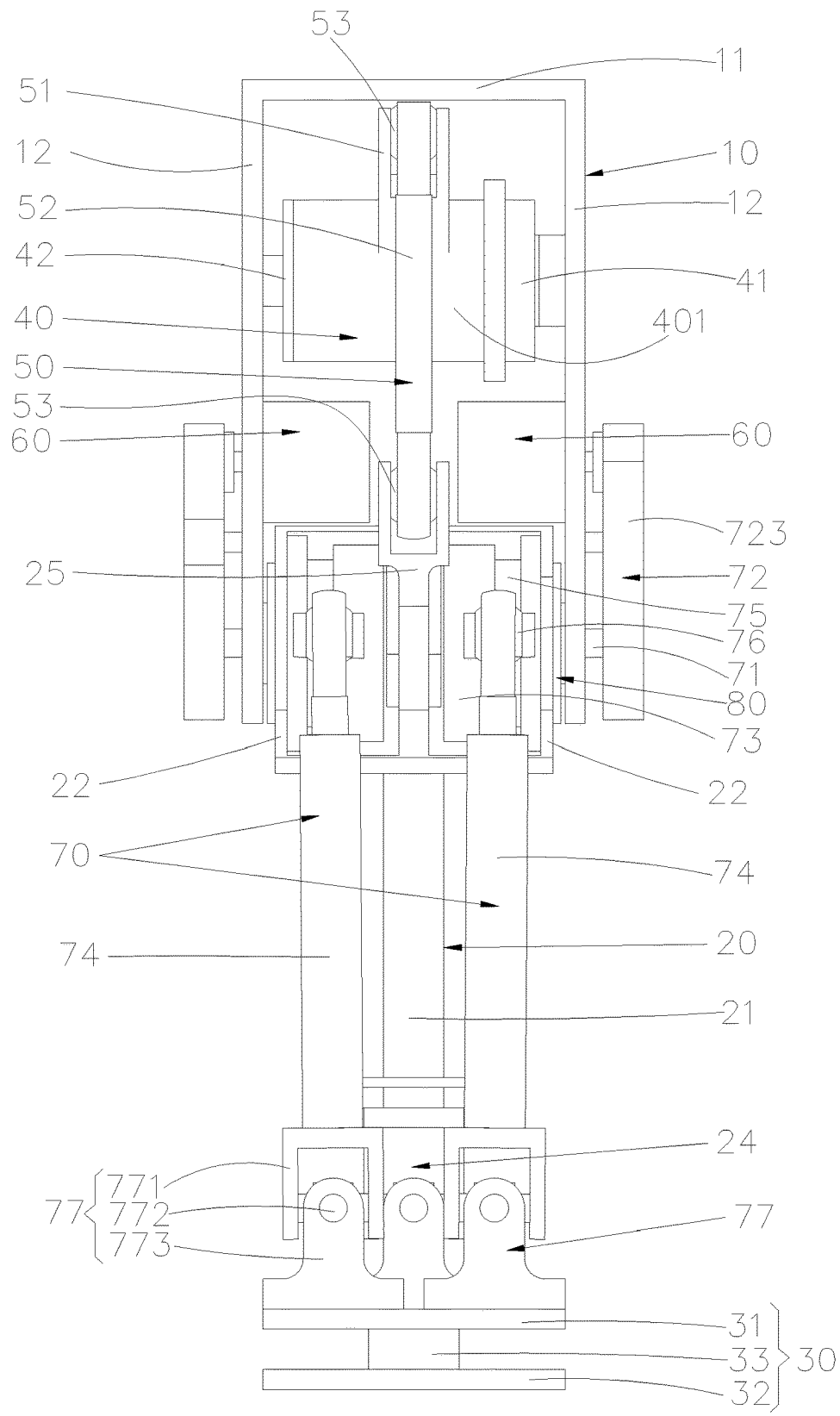
FIG. 2 is a front view of the leg mechanism of FIG. 1.
Figure 3:
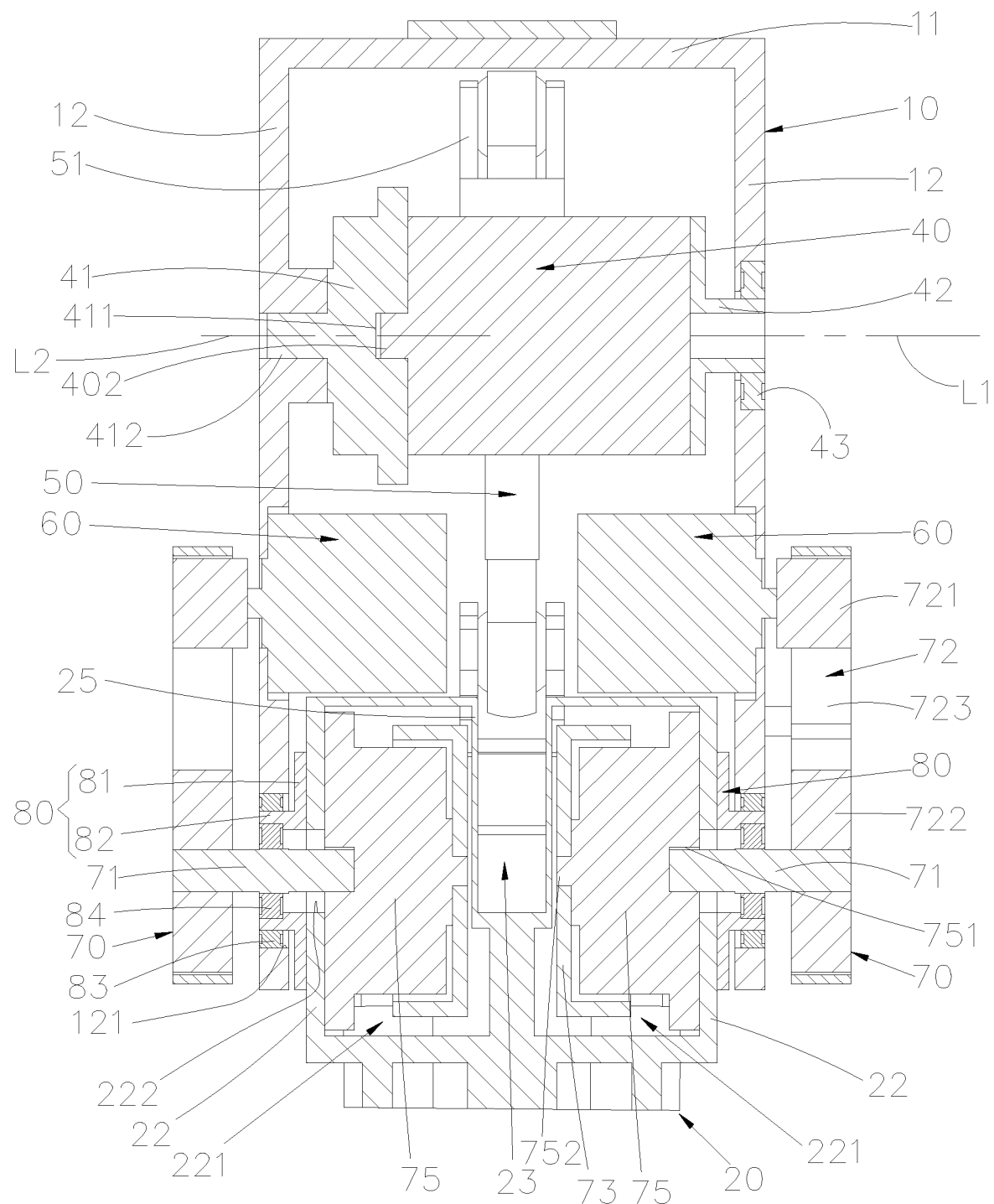
FIG. 3 is a rear cross-section view of the leg mechanism of FIG. 1.

Referring to FIGS. 1-3, in one embodiment, a leg mechanism 100 includes an upper leg 10, a lower leg 20 rotatably coupled to the upper leg 10, a foot 30 rotatably connected to the lower leg 20, a knee module actuator 40 mounted to the upper leg 10, a knee transmission mechanism 50 connected to the knee module actuator 40 and the lower leg 20 and configured to transmit rotary motion from the knee module actuator 40 to the lower leg 20, at least one ankle module actuator 60 mounted to the upper leg 10, and at least one ankle transmission mechanism 70 connected to the at least one ankle module actuator 60 and the foot 30 and configured to transmit rotary motion from the at least one ankle module actuator 60 to the foot 30.

Compared with conventional robots, the heavy knee module actuator 40 is mounted to the upper 10, and motion of the knee module actuator 40 is transmitted to the lower leg 20 through the knee transmission mechanism 50, which drives the lower leg 20 to swing. This arrangement renders the upper leg 10 to have reduced moment of inertia, thereby reducing the mechanical power required by the knee joint between the upper leg 10 and the lower leg 20. In addition, the heavy ankle module actuator 60 is mounted to the upper 10, and motion of the ankle module actuator 60 is transmitted to the foot 30 through the ankle transmission mechanism 70, which drives the foot 30 to rotate. This arrangement renders the lower leg 20 to have reduced moment of inertia, thereby reducing the mechanical power required by the ankle joint between the lower leg 20 and the foot 30.

In one embodiment, the knee module actuator 40 is located on the upper portion of the upper leg 10, which further reduces the moment of inertia of the upper leg 10, thereby reducing the mechanical power required by the knee joint between the upper leg 10 and the lower leg 20. The ankle joint module actuator 60 is arranged below the knee module actuator 40 and mounted to the upper leg 10, which can make the overall structure compact, and allow the upper leg 10 and the lower leg 20 to have reduced moment of inertia.

Referring to FIG. 3, in one embodiment, the knee module actuator 40 is a rotary actuator having a casing 401 and an output shaft 402. The output shaft 402 is connected to the upper leg 10 and the casing 401 is rotatably connected to the upper leg 10 and is rotatable about an axis of rotation that coincides with the axis of rotation of the output shaft 402. With such arrangement, it is equivalent to that the output shaft 402 of the knee module actuator 40 is fixed, and the casing 401 of the knee module actuator 40 rotates with respect to the output shaft 402. The knee module actuator 40 can be a rotating motor.

Figure 4:
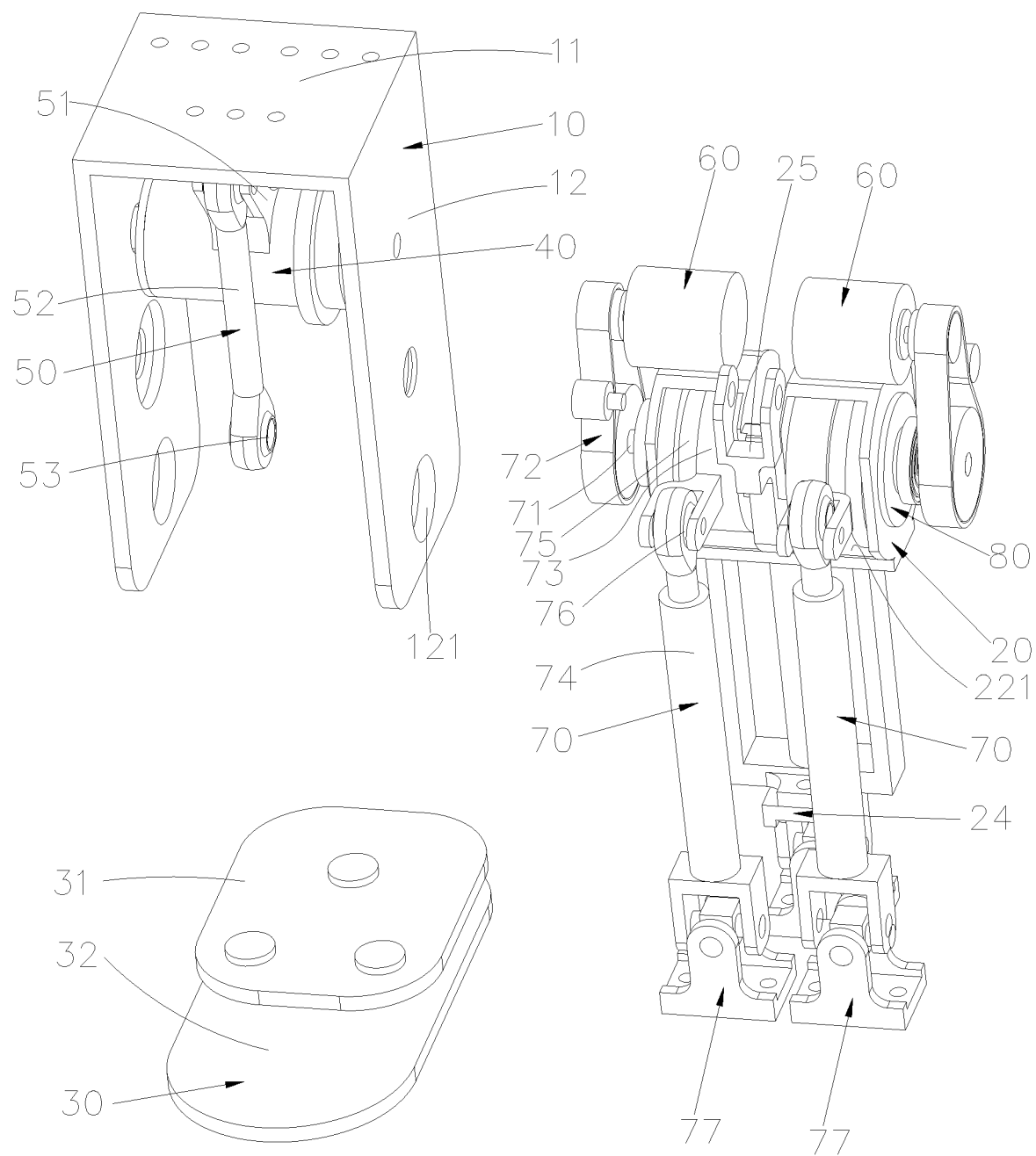
FIG. 4 is an isometric exploded view of the leg mechanism.
Figure 5:
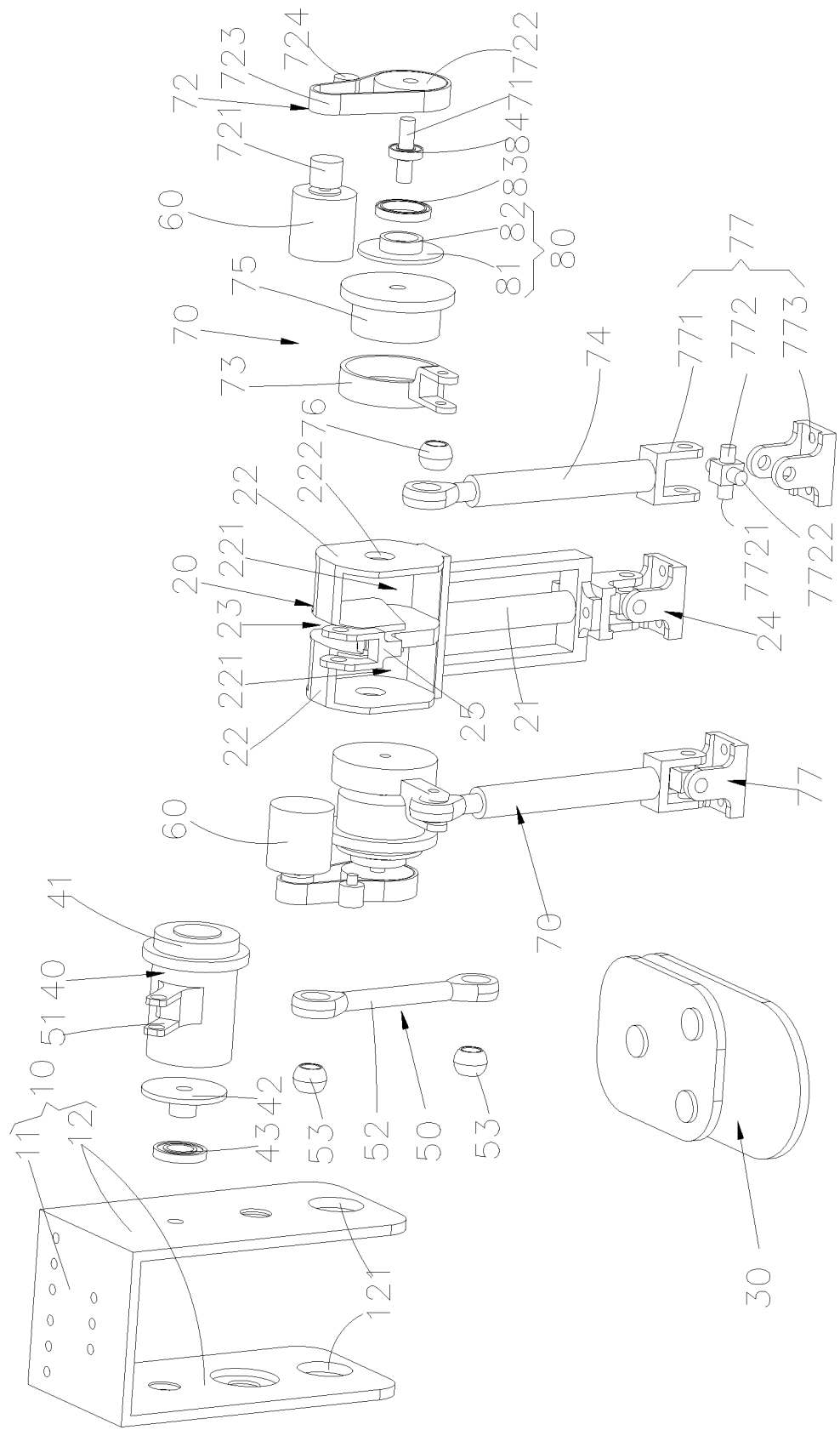
FIG. 5 is another isometric exploded view of the leg mechanism.

Referring to FIGS. 3-5, in one embodiment, a speed reducer 41 is connected to the output shaft of the knee module actuator 40 and the upper leg 10. The speed reducer 41 has an input shaft 411 and an output shaft 412. The input shaft 411 is fixed to the output shaft 402 of the knee module actuator 40, and the output shaft 412 of the speed reducer 41 is fixed to the upper leg 10. The speed reducer 41 is provided to reduce the rotational speed to increase the output torque, and cooperate with the knee transmission mechanism 50 to control rotation of the knee joint. When the knee module actuator 40 is a rotating motor, its rotor and the motor shaft rotate synchronously. The output shaft 402 of the knee module actuator 40 is connected to the input shaft 411 of the speed reducer 41, and the output shaft 412 of the speed reducer 41 is fixed to the upper leg 10. The casing 401 of the knee module actuator 40 rotates to output power. The speed reducer 41 can be a harmonic reducer, an RV reducer, a planetary reducer, and the like.

Referring to FIGS. 3 and 5, in one embodiment, a connecting member 42 is fixed to the casing of the knee module actuator 40 opposite the output shaft of the knee module actuator 40. The connecting member 42 is rotatably connected to the upper leg 10 and is rotatable about an axis of rotation L1 that coincides with an axis of rotation L2 of the output shaft 412 of the speed reducer 41. The connecting member 42 may be rotatably connected to the upper leg 10 through a bearing 43. With such configuration, the casing of the knee module actuator 40 can rotate freely and output mechanical power stably.

Figure 7:
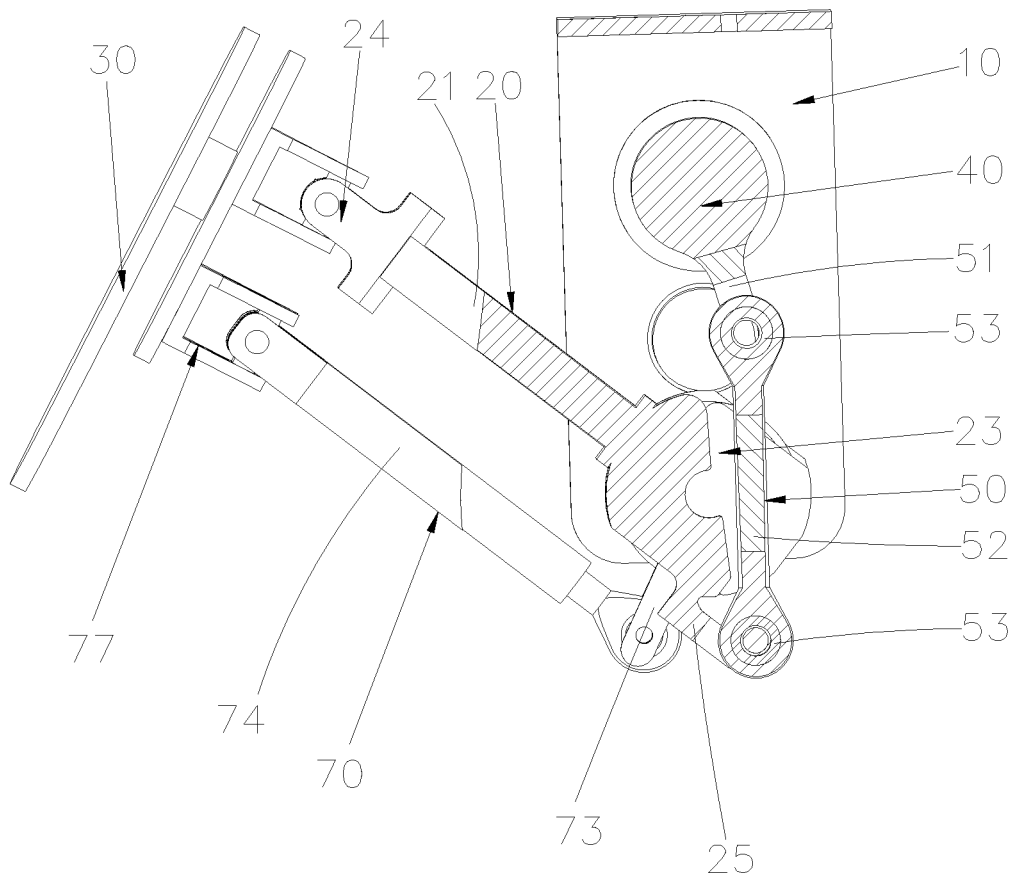
FIG. 7 is similar to FIG. 6, but showing a lower leg of the leg mechanism in a flexed state.

Referring to FIGS. 1, 5 and 7, in one embodiment, in one embodiment, the knee transmission mechanism 50 includes a first linking member 51 having a portion securely arranged around the casing of the knee module actuator 40, and a second linking member 52 having opposite ends that are rotatably connected to the first linking member 51 and the lower leg 20. The upper leg 10, the first linking member 51, the second linking member 52, and the lower leg 20 form a four-bar linkage mechanism. The casing of the knee module actuator 40 is used as a rotating part to control the knee joint such that the lower leg 20 can rotate relative to the upper leg 10.

Referring to FIGS. 5 and 7, in one embodiment, the lower leg 30 defines a groove 23. When the lower leg 20 rotates backward, the second linking member 52 will enter into the groove 23 to avoid interference with the lower leg 20.

Referring to FIGS. 5 and 7, in one embodiment, the first linking member 51 and the second linking member 52 are coupled to each other through one articulated bearing 53, and the lower leg 20 and the second linking member 52 are coupled to each other through one articulated bearing 53. The articulated bearings 53 are spherical plain bearings that have an inner ring with a sphere that is convex on its outside and an inner ring with a concave sphere on its inside. The articulated bearings 53 allow for not only rotational movement but also oscillating movement. The joint bearing 53 has the characteristics of large load capacity, impact resistance, corrosion resistance, wear resistance, self-aligning, and good lubrication. The joint bearing 53 allows the first linking member 51 and the second linking member 52 to reliably rotate with respect to each other during transmission.

Figure 8:
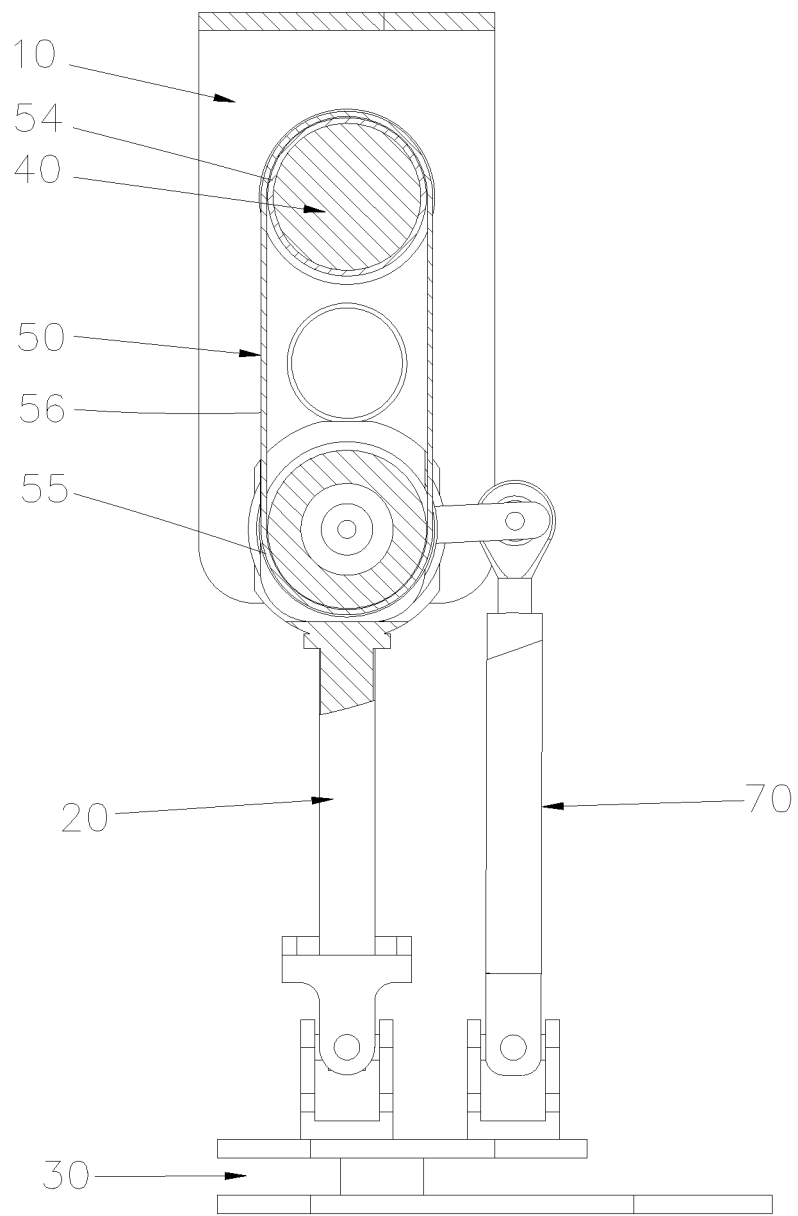
FIG. 8 is similar to FIG. 6, but viewed form a different perspective.

Referring to FIG. 8, in one embodiment, the knee transmission mechanism 50 includes a first wheel 54 that is connected to and driven by the knee module actuator 40, a second wheel 55 fixed to the lower leg 20, and a belt 56 arranged around the first wheel 54 and the second wheel 55. With such configuration, the mechanical power of the knee module actuator 40 can be transmitted to the knee joint, so that the lower leg 20 can rotate relative to the upper leg 10.

Referring to FIGS. 1, 2 and 5, in one embodiment, the at least one ankle module actuator 60 is two in number, and the at least one ankle transmission mechanism 70 is two in number. The ankle module actuators 60 each includes an output shaft 601 that is connected to one corresponding ankle transmission mechanism 70. The ankle transmission mechanisms 70 each includes an output end 701 that is movably connected to the foot 30. The output ends 701 of the ankle transmission mechanisms 70 and the lower leg 20 are movably connected to the foot 30 through three connecting mechanisms that are located at three vertices of a triangle. With this solution, the pitching movement and the rolling movement of the foot 30 can be realized. As shown in FIG. 1, since the three connecting mechanisms are located at three vertices of a triangle, the weight of the robot is transmitted to a support surface (e.g., floor, ground, etc.) via the lower leg 20 and the foot 30, ensuring the stability of the lower leg 20 relative to the foot 30 when the leg mechanism stands on the support surface.

Figure 9:
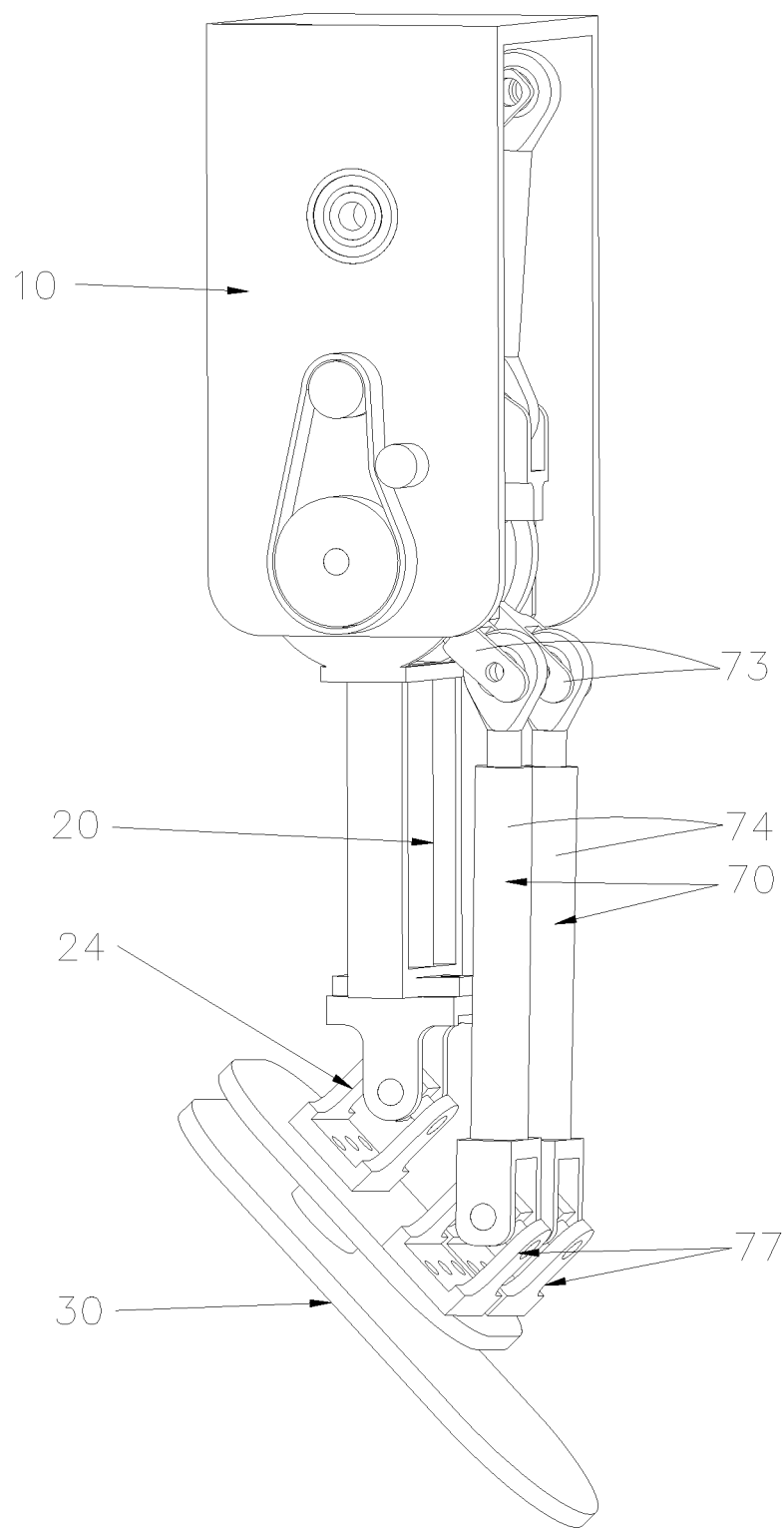
FIG. 9 is an isometric view of the leg mechanism, showing plantarflexion of a foot of the leg mechanism.
Figure 10:
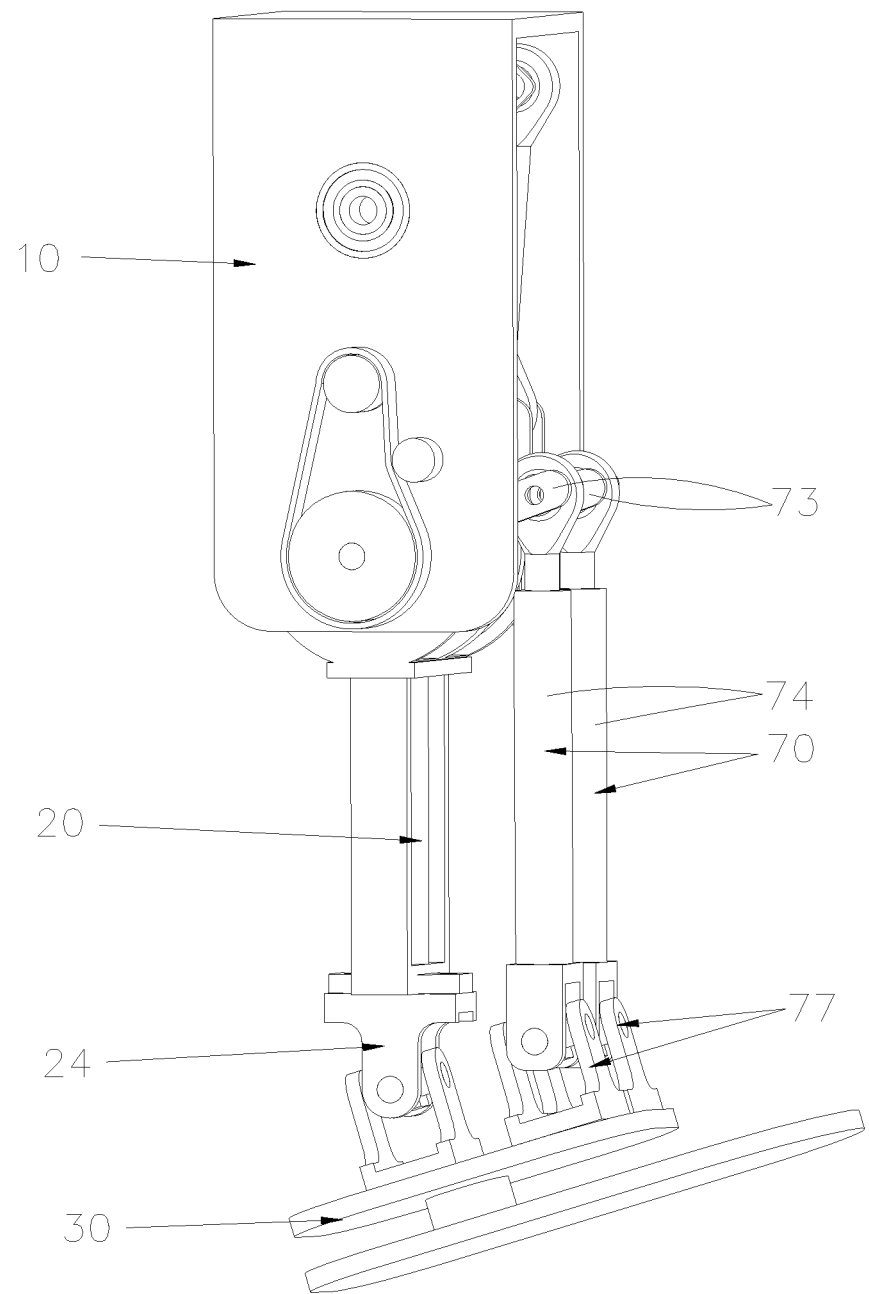
FIG. 10 is similar to FIG. 9, but showing dorsiflexion of the foot of the leg mechanism.

The connecting mechanism between the foot 30 and the lower leg 20 is located at the rear of the foot 30, and the connecting mechanisms between the output ends of the two ankle transmission mechanisms 70 and the foot 30 is located at the front of the foot 30. Referring to FIGS. 9 and 10, when the connecting mechanisms between the output ends of the two ankle transmission mechanisms 70 and the foot 30 move in the same direction, the pitching movement of the ankle joint is realized. That is, the front end of the foot 30 moves up or down. Referring to FIGS. 9 and 10, when the connecting mechanisms between the output ends of the two ankle transmission mechanisms 70 and the foot 30 respectively move up and down, the combined movement of the ankle joint including rolling movement and pitching movement is realized. That is, the front end of the foot 30 moves up or down while performing inversion/eversion.

Referring to FIGS. 1, 3 and 5, in one embodiment, the ankle module actuators 60 are rotary actuators. Each of the ankle transmission mechanisms 70 includes a transmission shaft 71 rotatably mounted to the lower leg 20, a transmission assembly 72 configured to transmit motion from one corresponding ankle module actuator 60 to the transmission shaft 71, a transmission link 73 that is driven to rotate by the transmission shaft 71 and extends forward, and a link shaft 74 having opposite ends that are respectively hinged to the transmission link 73 and the foot 30. With such configuration, the mechanical power of the ankle module actuators 60 can be transmitted to the foot 30 and the posture of the foot 30 can be adjusted. During operation, the mechanical power of the ankle module actuators 60 is transmitted to the transmission shafts 71 through the transmission assemblies 72, and the transmission shafts 71 drive the transmission links 73 to rotate. The lower leg 20, the transmission links 73, the link shafts 74 and the foot 30 form a link mechanism, and the link shafts 74 drive the foot 30 to move.

Figure 6:
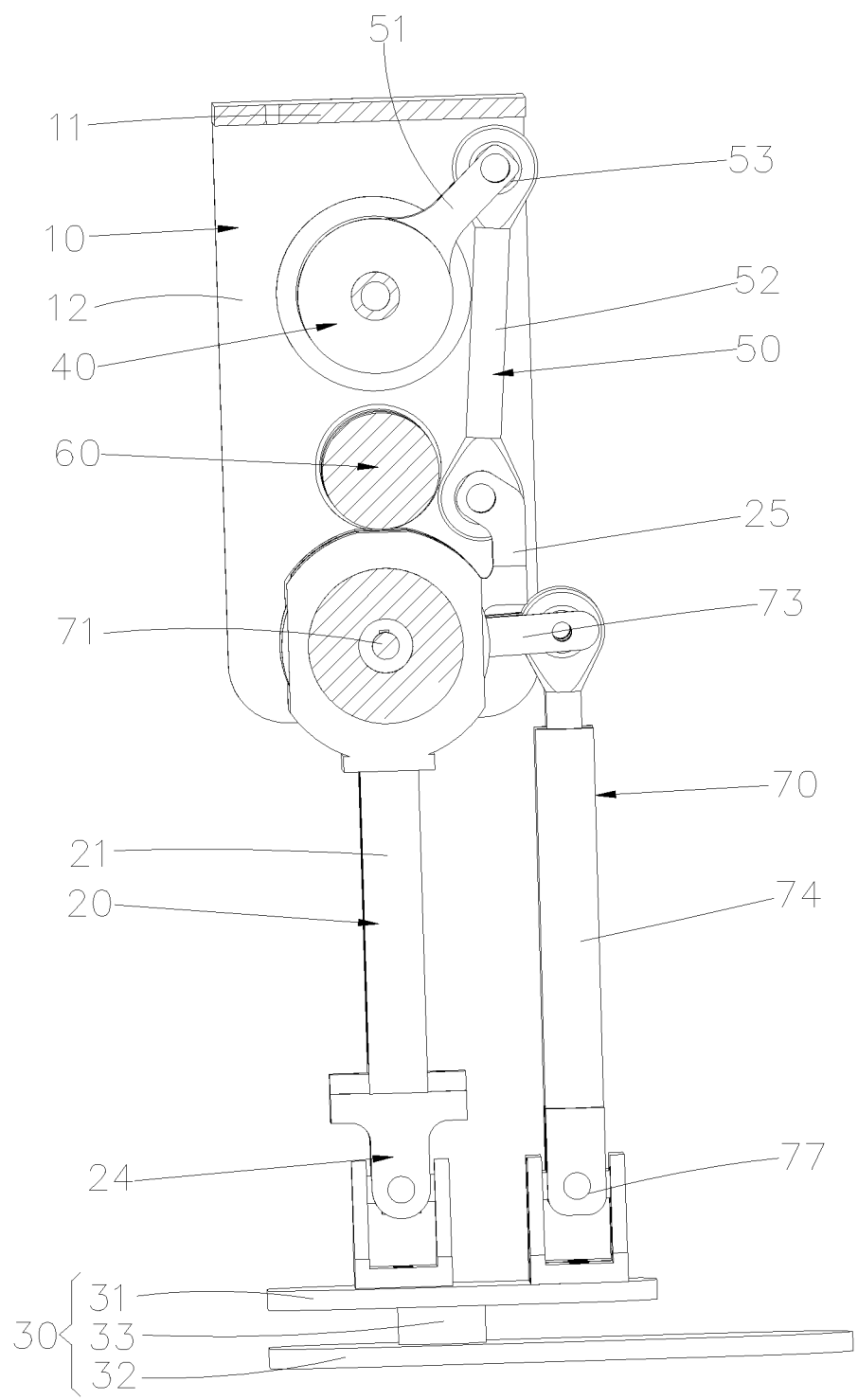
FIG. 6 is a side cross-section view of the leg mechanism of FIG. 1.
Figure 11:
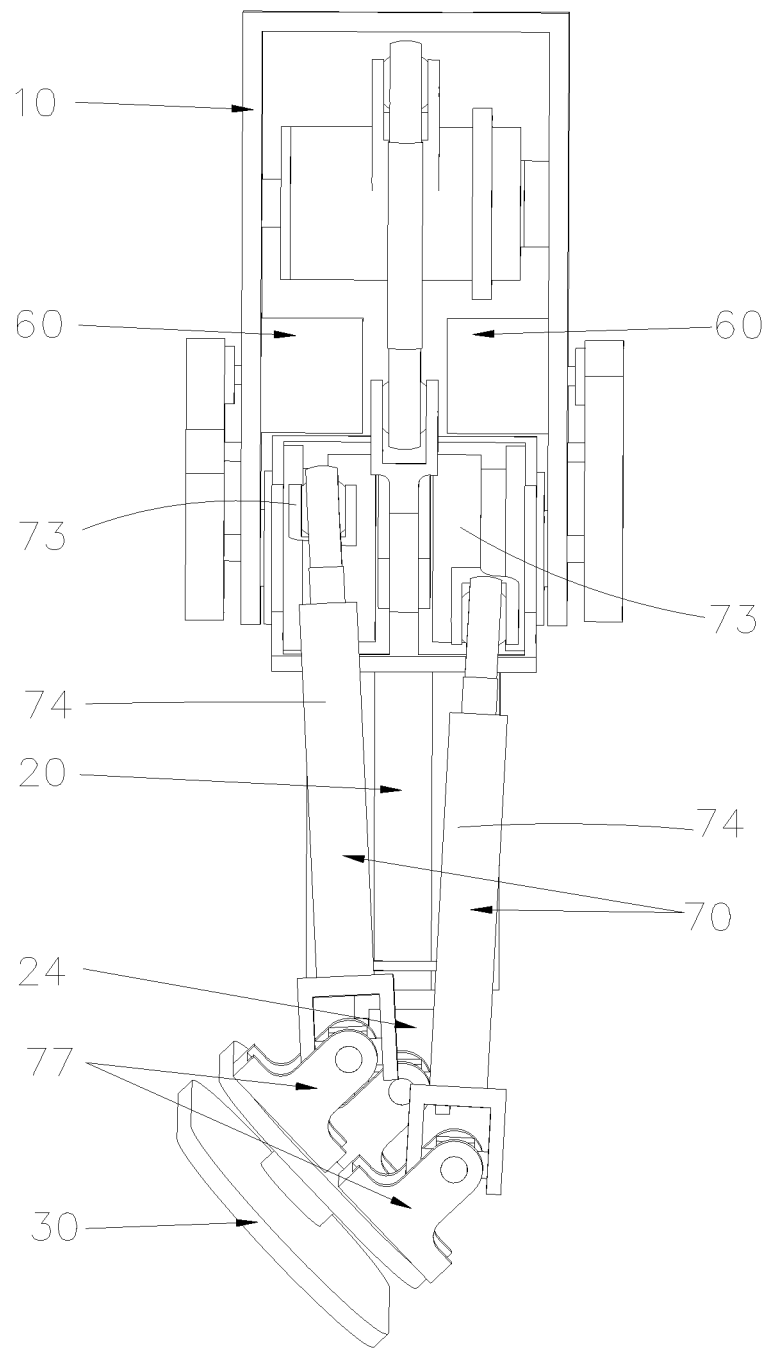
FIG. 11 is a front view of the leg mechanism, showing eversion of the foot of the leg mechanism.
Figure 12:
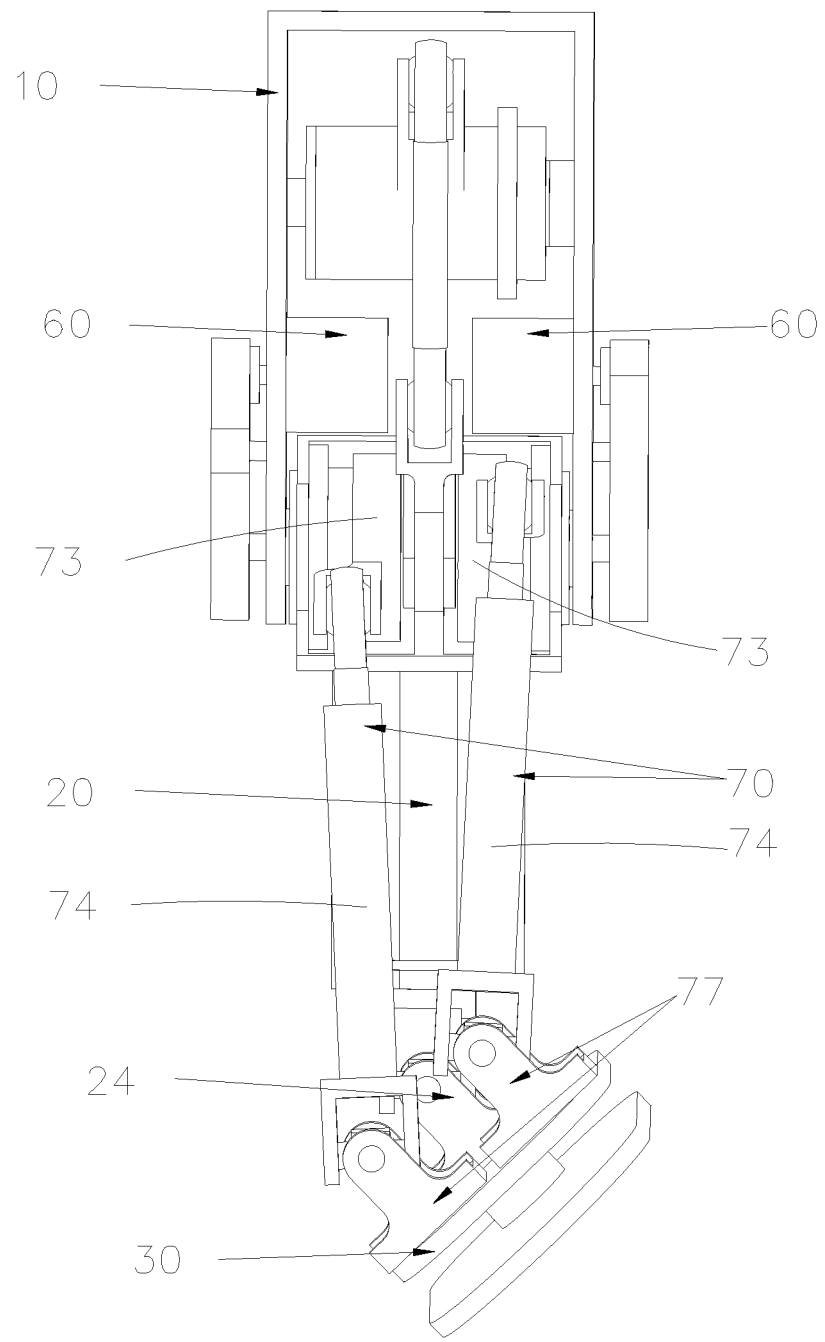
FIG. 12 is similar to FIG. 11, but showing inversion of the foot of the leg mechanism.
Figure 13:
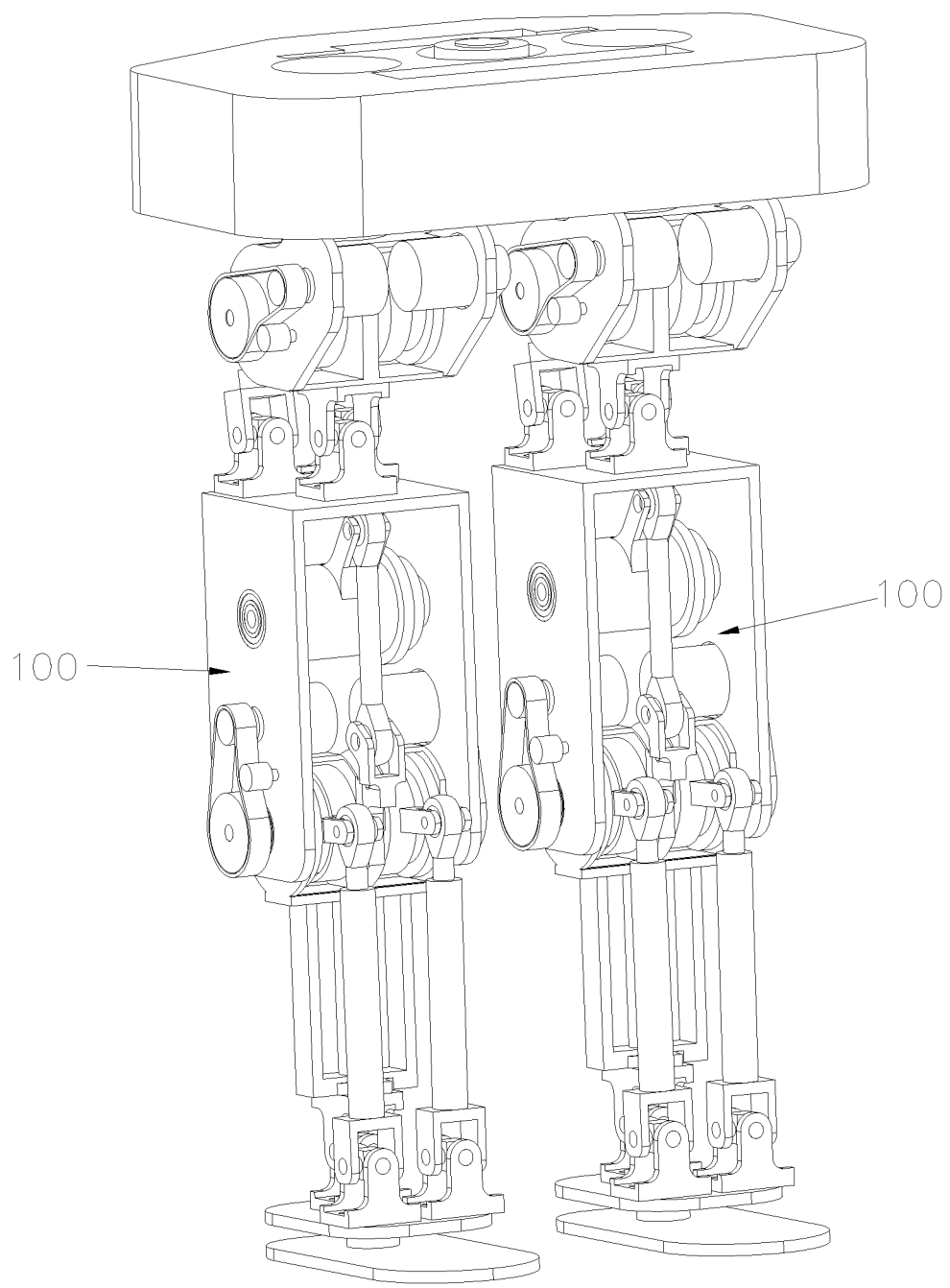
FIG. 13 is an isometric view of a robot according to one embodiment.

The foot 30 is connected to the lower end of the lower leg 20. The lower leg 20 cooperates with the two ankle module actuators 60 and ankle transmission mechanisms 70, which allows the foot 30 to be adjusted in the three connecting mechanisms, thereby realizing the pitching movement and rolling movement of the foot 30. Referring to FIGS. 9 and 10, when the two transmission links 73 rotate in the same direction, the pitching movement of the ankle joint is realized. Referring to FIGS. 11 and 12, when the two transmission links 73 rotate in different directions, a combined movement of the ankle joint including rolling movement and pitching movement is realized. Referring to FIGS. 1 and 6, when the lower leg 20 is in a standing state, the two link shafts 74 and the lower leg 20 are both extend in a vertical direction, and the transmission links 73 extends toward the front of the robot to reliably support the upper leg 10 and associated components.

The ankle module actuators 60 can be motors. The ankle module actuators 60 are fixed to the upper leg 10, and the cables extending out of the ankle module actuators 60 can be attached to the upper leg 10 to avoid the difficulty of wiring and the wear of the cables due to the relative rotation of joints of the robot. In one embodiment, the ankle module actuators 60 are coaxially arranged and fixed to the upper leg 10, and respectively cooperate with the ankle transmission mechanisms 70 to drive the two connecting positions of the foot 30, thereby adjusting the posture of the foot 30 and making the structure compact.

Referring to FIGS. 1, 3 and 5, in one embodiment, the transmission assembly 72 includes a first transmission wheel 721 fixed to the output shaft of one corresponding ankle module actuator 60, a second transmission wheel 722 coaxially fixed to the transmission shaft 71, and a transmission belt 723 arranged around the first transmission wheel 721 and the second transmission belt 722. With the belt transmission mechanism, the mechanical power of the ankle module actuators 60 can be transmitted to the transmission shafts 71, so that the transmission shafts 71 can rotate. In addition, the upper leg 10 is also provided with a tensioning wheel 724, which presses against the transmission belt 723, so that the belt transmission mechanism works reliably.

In an alternative embodiment, the transmission mechanism 72 may be a chain transmission mechanism. In this way, the mechanical power of the ankle module actuators 60 can also be transmitted to the transmission shafts 71, so that the transmission shafts 71 can rotate.

Referring to FIGS. 2, 3 and 5, in one embodiment, two speed reducers 75 are arranged between the transmission shafts 71 and the transmission links 73. Each of the speed reducers 75 includes an input shaft 751 fixed to one corresponding transmission shaft 71, and an output shaft 752 fixed to one corresponding transmission link 73. The speed reducers 75 are provided to reduce the rotation speed to increase the torque, so that the transmission links 73 can output a predetermined mechanical power, thereby driving the link shafts 74 and the foot 30 to move. The speed reducers 75 can be harmonic reducers, RV reducers, planetary reducers, and the like.

Referring to FIGS. 1 and 3, in one embodiment, the ankle module actuators 60 are arranged within the upper leg 10. The output shaft of each ankle module actuator 60 has an end extend to an outside of the upper leg 10, and the transmission assemblies 72 are arranged outside of the upper leg 10. With such configuration, the structure is simple and compact, and the at least one ankle module actuator 60 can be protected.

Referring to FIGS. 1, 3 and 5, in one embodiment, the lower leg 20 defines two chambers 221, and the speed reducers 75 are respectively received in the two chambers 221. One end of the lower leg 20 is received in the upper leg 10. The output shafts of the two speed reducers 75 are coaxially arranged, and the two speed reducers 75 are respectively arranged in different mounting chambers 221 of the lower leg 20, so as to facilitate the transmission of the mechanical power of the ankle module actuators 60 to the transmission links 73 through the speed reducers 75, so as to rotate the foot 30.

Referring to FIGS. 3 and 5, in one embodiment, the lower leg 20 defines two through holes 222 that are respectively in communication with the two chambers 221. The upper leg 10 defines two mounting holes 121 corresponding to the through holes 222. Each of the transmission shafts 71 passes through one corresponding through hole 222 and one corresponding mounting hole 121 and is connected to the input shaft of one corresponding speed reducer 75. In this way, it is convenient for the transmission shafts 71 to transmit mechanical power to the speed reducers 75, and the transmission shafts 71 are easily assembled to the upper leg 10 and the speed reducers 75.

Referring to FIGS. 3 and 5, in one embodiment, two mounting members 80 are fixed to the lower leg 20. Each of the two mounting members 80 includes a barrel 82 and a flange 81 extending around the barrel 82. The flange 81 of each of the two mounting members 80 is fixed to a corresponding external side of the lower leg 20. The barrel 82 of each of the two mounting members 80 is received in one corresponding mounting hole 121 of the upper leg 10. The two mounting members 80 are rotatably connected to the upper leg 10 through two bearings 83 that are arranged around the barrels 82 and received in the mounting holes 121 of the upper leg 10. The transmission shafts 71 are rotatably connected to the mounting members 80 through two bearings 84 that are arranged around the transmission shafts 71 and received in the barrels 82. In this way, it is easy to rotatably mount the lower leg 20 on the upper leg 10, and to rotatably mount the transmission shafts 71 on the mounting members 80. Bearing support enables free rotation between the two structural parts while making the overall structure compact.

Referring to FIGS. 1, 2 and 5, in one embodiment, the link shafts 74 and the transmission links 73 are connected to each other through articulated bearings 76. The articulated bearings 76 allow for reliable rotation between the link shafts 74 and the transmission links 73 during transmission. In one embodiment, the link shafts 74 are connected to the foot 30 through connecting mechanisms 77. In one embodiment, each connecting mechanism 77 includes an upper connecting part 771, a cross shaft 772, and a lower connecting part 773. The cross shaft 772 is rotatably connected to the upper connecting part 771 and the lower connecting part 773. The upper connecting part 771 is fixed to the lower end of the link shaft 74, and the lower connecting part 773 is fixed to the foot 30, so that the link shaft 74 is movably connected to the foot 30 and rotatable with respect to the foot about two axes of rotation respectively extending along the two shafts 7721 and 7722 of the cross shaft 772 that are perpendicular to each other. The foot 30 is connected to the lower leg 30 through a connecting mechanism 24 that has a configuration similar to the connecting mechanism 77. The foot 30 is rotatable with respect to the lower leg 30 about two axes of rotation respectively extending along the two shafts of a cross shaft of the connecting mechanism 24.

Referring to FIGS. 3-5, in one embodiment, the upper leg 10 includes an upper plate 11 and two side plates 12 that are fixed to the upper plate 11, defining a receiving space that receives the knee module actuator 40 and the ankle module actuators 60. The knee module actuator 40 is arranged between the two side plates 12, and the ankle module actuators 60 are fixed to the inner surfaces of the two side plates 12. The output shafts of the two ankle module actuators 60 each have an end extending to the outside of the side plates 12 and are connected to the transmission assemblies 72 outside the thigh side plate 12. The upper end of the lower leg 20 is received in the receiving space. The transmission shafts 71 connected with the transmission assemblies 72 penetrate the side plates 12 and the sidewalls of the lower leg 20 from the outside to the inside, and then is connected with the speed reducers 75. With such configuration, the structure is simple and compact, and the at least one ankle module actuator 60 can be protected.

Referring to FIGS. 2, 3 and 5, in one embodiment, the lower leg 20 includes a rod 21 and two housings 22 fixed to the upper end of the rod 21. The lower end of the rod 21 is connected to the foot 30. The two housings 22 define the two chambers 221, respectively. This configuration allows the lower leg 20 to have reduced weight and moment of inertia, which can effectively reduce the mechanical power required by the ankle joint between the lower leg 20 and the foot 30. The groove 23 is defined between the two housings 22. The lower leg 20 includes an extension arm 25 extending between the two housings 22 for hinged connection with the second linking member 52. Referring to FIGS. 6 and 7, the upper leg 10, the first linking member 51, the second linking member 52 and the extension arm 25 form a four-link mechanism to control the movement of the knee joint.

Referring to FIGS. 2 and 6, in one embodiment, the foot 30 includes a support plate 31, a sole plate 32 arranged under the support plate 31 and a six-axis force and torque sensor 33 arranged between the support plate 31 and the sole plate 32. The support plate is connected to the lower leg 20, and an output end of each ankle transmission mechanism 70 is movably connected to the support plate 31. The six-axis force and torque sensor 33 is arranged between the support plate 31 and the sole plate 32, so that the e six-axis force and torque sensor 33 can be protected. When a robot is walking, the force acting on the support plate 31 is transmitted to the six-axis force and torque sensor 33. The six-axis force and torque sensor 33 can measure multiple directional force components and torque components, and send the detected force to the controller of the robot so that the controller can determine the force acting on the foot 30. The controller can then control the output mechanical power of the knee module actuator 40 and the ankle module actuators 60.

Referring to FIGS. 1 and 3, in one embodiment, a robot includes the leg mechanism as described above. In the embodiment, the heavy knee module actuator 40 is mounted to the upper 10, and motion of the knee module actuator 40 is transmitted to the lower leg 20 through the knee transmission mechanism 50, which drives the lower leg 20 to swing. This arrangement renders the upper leg 10 to have reduced moment of inertia, thereby reducing the mechanical power required by the knee joint between the upper leg 10 and the lower leg 20.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A leg mechanism of a humanoid robot, comprising:
    an upper leg;
    a lower leg rotatably coupled to the upper leg;
    a knee module actuator mounted to the upper leg;
    a foot rotatably connected to the lower leg;
    a knee transmission mechanism connected to the knee module actuator and the lower leg and configured to transmit rotary motion from the knee module actuator to the lower leg;
    at least one ankle module actuator mounted to the upper leg; and
    at least one ankle transmission mechanism connected to the at least one ankle module actuator and the foot and configured to transmit rotary motion from the at least one ankle module actuator to the foot;
    wherein the knee module actuator comprises a rotary actuator having a casing and an output shaft, the output shaft is connected to the upper leg and the casing is rotatably connected to the upper leg.

2. The leg mechanism according to claim 1, further comprising a speed reducer connected to the output shaft and the upper leg, wherein the speed reducer comprises an input shaft and an output shaft, the input shaft is fixed to the output shaft of the rotary actuator, and the output shaft of the speed reducer is fixed to the upper leg.

3. The leg mechanism according to claim 2, further comprising a connecting member, wherein the connecting member is fixed to the casing of the rotary actuator opposite the output shaft of the rotary actuator, the connecting member is rotatably connected to the upper leg and is rotatable about an axis of rotation that coincides with an axis of rotation of the output shaft of the speed reducer.

4. The leg mechanism according to claim 1, wherein the knee transmission mechanism comprises a first linking member fixed to the casing of the rotary actuator, and a second linking member that is rotatably connected to the first linking member and the lower leg.

5. The leg mechanism according to claim 1, wherein the knee transmission mechanism comprises a first wheel that is connected to and driven by the knee module actuator, a second wheel fixed to the lower leg, and a belt arranged around the first wheel and the second wheel.

6. The leg mechanism according to claim 1, wherein the at least one ankle module actuator is two in number, the at least one ankle transmission mechanism is two in number, the ankle module actuators each comprise an output shaft that is connected to one corresponding ankle transmission mechanism, the ankle transmission mechanisms each comprise an output end that is movably connected to the foot, the output ends of the ankle transmission mechanisms and the lower leg are movably connected to the foot through three connecting mechanisms that are located at three vertices of a triangle.

7. The leg mechanism according to claim 6, wherein each of the ankle module actuators comprises a rotary actuator, each of the ankle transmission mechanisms comprises a transmission shaft rotatably mounted to the lower leg, a transmission assembly configured to transmit motion from one corresponding ankle module actuator to the transmission shaft, a transmission link driven to rotate by the transmission shaft, and a link shaft having opposite ends that are respectively hinged to the transmission link and the foot.

8. The leg mechanism according to claim 7, wherein the transmission assembly comprises a first transmission wheel fixed to the output shaft of one corresponding ankle module actuator, a second transmission wheel fixed to the transmission shaft, and a transmission belt arranged around the first transmission wheel and the second transmission belt.

9. The leg mechanism according to claim 7, further comprising two speed reducers that are arranged between the transmission shafts and the transmission links, wherein each of the speed reducers comprises an input shaft fixed to one corresponding transmission shaft, and an output shaft fixed to one corresponding transmission link.

10. The leg mechanism according to claim 9, wherein the ankle module actuators are arranged within the upper leg, the output shaft of each of the ankle module actuators has an end extended to an outside of the upper leg, and the transmission assemblies are arranged outside of the upper leg;
the lower leg defines two chambers, and the speed reducers are respectively received in the two chambers; one end of the lower leg is received in the upper leg;
the lower leg defines two through holes that are respectively in communication with the two chambers, the upper leg defines two mounting holes, each of the transmission shafts passes through one corresponding through hole and one corresponding mounting hole and is connected to the input shaft of one corresponding speed reducer.

11. The leg mechanism according to claim 10, further comprising two mounting members fixed to the lower leg, wherein each of the two mounting members comprises a barrel and a flange extending around the barrel, the flange of each of the two mounting members is fixed to a corresponding side of the lower leg, and the barrel of each of the two mounting members is received in one corresponding mounting hole of the upper leg;
the two mounting members are rotatably connected to the upper leg through two bearings that are arranged around the barrels and received in the mounting holes of the upper leg;
the transmission shafts are rotatably connected to the mounting members through two bearings that are arranged around the transmission shafts and received in the barrels.

12. The leg mechanism according to claim 1, wherein the upper leg comprises an upper plate and two side plates that are fixed to the upper plate, the knee module actuator is arranged between the two side plates, and the at least one ankle module actuator is fixed to an inner surface of one of the two side plates.

13. The leg mechanism according to claim 1, wherein the foot comprises a support plate, a sole plate arranged under the support plate and a six-axis force and torque sensor arranged between the support plate and the sole plate, the support plate is connected to the lower leg, and an output end of the at least one ankle transmission mechanism is movably connected to the support plate.

14. A humanoid robot comprising:
a leg comprising:
an upper leg;
a lower leg rotatably coupled to the upper leg;
a knee module actuator mounted to the upper leg;
a foot rotatably connected to the lower leg;
a knee transmission mechanism connected to the knee module actuator and the lower leg and configured to transmit rotary motion from the knee module actuator to the lower leg;
at least one ankle module actuator mounted to the upper leg; and
at least one ankle transmission mechanism connected to the at least one ankle module actuator and the foot and configured to transmit rotary motion from the at least one ankle module actuator to the foot;
wherein the knee module actuator comprises a rotary actuator having a casing and an output shaft, the output shaft is connected to the upper leg and the casing is rotatably connected to the upper leg.

15. The robot according to claim 14, further comprising a speed reducer connected to the output shaft and the upper leg, wherein the speed reducer comprises an input shaft and an output shaft, the input shaft is fixed to the output shaft of the rotary actuator, and the output shaft of the speed reducer is fixed to the upper leg.

16. The robot according to claim 15, further comprising a connecting member, wherein the connecting member is fixed to the casing of the rotary actuator opposite the output shaft of the rotary actuator, the connecting member is rotatably connected to the upper leg and is rotatable about an axis of rotation that coincides with an axis of rotation of the output shaft of the speed reducer.

17. The robot according to claim 14, wherein the knee transmission mechanism comprises a first linking member fixed to the casing of the rotary actuator, and a second linking member having opposite ends that are rotatably connected to the first linking member and the lower leg.

18. The robot according to claim 14, wherein the knee transmission mechanism comprises a first wheel that is connected to and driven by the knee module actuator, a second wheel fixed to the lower leg, and a belt arranged around the first wheel and the second wheel.

\* \* \* \* \*